US012651433B2

(12) United States Patent
Snell

(10) Patent No.: US 12,651,433 B2
(45) Date of Patent: Jun. 9, 2026

(54) METHODS FOR ARTIFICIAL NEURAL NETWORKS

(71) Applicant: JENOPTIK UK Ltd, Camberley (GB)

(72) Inventor: Violet Snell, Petersfield (GB)

(73) Assignee: Jenoptik UK Ltd., Camberley (GB)

( * ) Notice: Subject to any disclaimer, the term of this patent is extended or adjusted under 35 U.S.C. 154(b) by 1031 days.

(21) Appl. No.: 17/039,230

(22) Filed: Sep. 30, 2020

(65) Prior Publication Data

US 2021/0097398 A1    Apr. 1, 2021

(30) Foreign Application Priority Data

Sep. 30, 2019    (EP) .................................... 19200355

(51) Int. Cl.
*G06V 10/764* (2022.01)
*B60W 40/105* (2012.01)
(Continued)

(52) U.S. Cl.
CPC ......... *G06V 10/764* (2022.01); *B60W 40/105* (2013.01); *G06F 18/214* (2023.01);
(Continued)

(58) Field of Classification Search
CPC ...... G06V 10/764; G06V 20/54; G06V 20/63; G06V 10/82; G06V 20/62; G06V 20/56;
(Continued)

(56) References Cited

U.S. PATENT DOCUMENTS 9,785,855 B2    10/2017    Gordo Soldevila et al.
2013/0182910 A1*    7/2013    Burry .................... G06F 18/243
382/105
(Continued)

FOREIGN PATENT DOCUMENTS

EP    3182334 A1    6/2017

OTHER PUBLICATIONS

Classification in the Presence of Label Noise: a Survey Benoît Frénay and Michel Verleysen, Member, IEEE 2013.*
(Continued)

*Primary Examiner* — Sherrod L Keaton
(74) *Attorney, Agent, or Firm* — Muncy, Geissler, Olds & Lowe, P.C.

(57) ABSTRACT
A method for an artificial neural network including: providing the artificial neural network, wherein the artificial neural network is trained to reduce the confidence of the artificial neural network in classifying inputs outside a desirable input distribution is provided by training the artificial neural network using a first set of inputs and associated labels, the labels correctly classifying the corresponding inputs, wherein the inputs within the first set are within the desirable input distribution of the artificial neural network; training the artificial neural network using a second set of inputs and associated labels, wherein the inputs within the second set are outside of the desirable input distribution of the artificial neural network, and wherein the labels within the second set comprise randomly assigned classifications; and feeding one or more inputs through the artificial neural network to determine classifications, classifying the inputs, and confidence values associated with the classifications.

9 Claims, 5 Drawing Sheets

(51) Int. Cl.

| | |
|---|---|
| *G06F 18/214* | (2023.01) |
| *G06F 18/22* | (2023.01) |
| *G06F 18/2415* | (2023.01) |
| *G06N 3/084* | (2023.01) |
| *G06N 5/046* | (2023.01) |
| *G06V 10/82* | (2022.01) |
| *G06V 20/54* | (2022.01) |
| *G06V 20/56* | (2022.01) |
| *G06V 20/62* | (2022.01) |

(52) U.S. Cl.
CPC .......... *G06F 18/22* (2023.01); *G06F 18/2415* (2023.01); *G06N 3/084* (2013.01); *G06N 5/046* (2013.01); *G06V 10/82* (2022.01); *G06V 20/54* (2022.01); *G06V 20/56* (2022.01); *G06V 20/62* (2022.01); *G06V 20/63* (2022.01); *B60W 2720/103* (2013.01)

(58) Field of Classification Search
CPC .... G06F 18/22; G06F 18/214; G06F 18/2415; B60W 40/105; B60W 2720/103; G06N 3/084; G06N 5/046
See application file for complete search history.

(56) References Cited

U.S. PATENT DOCUMENTS

| | | | | |
|---|---|---|---|---|
| 2013/0272579 | A1* | 10/2013 | Burry | G06V 20/63 |
| | | | | 382/105 |
| 2019/0005386 | A1 | 1/2019 | Chen et al. | |
| 2019/0042871 | A1* | 2/2019 | Pogorelik | G06T 5/70 |
| 2020/0005133 | A1* | 1/2020 | Zhang | G06N 3/045 |
| 2020/0050945 | A1* | 2/2020 | Chen | G06F 18/214 |
| 2021/0067745 | A1* | 3/2021 | Rosenberg | G06V 10/764 |
| 2021/0303899 | A1* | 9/2021 | Mains, Jr. | H04N 7/188 |

OTHER PUBLICATIONS

Vishal Jain et al, "Deep Automatic Licence Plate Recognition system", ICVGIP, Dec. 2016, ISBN 978-1-4503-4753-2/16/12.

Orhan Bulan et al, "Segmentation- and Annotation-Free License Plate Recognition With Deep Localization and Failure Identification," IEEE Transactions on Intelligent Transportation Systems, Sep. 2017, pp. 2351-2363, vol. 18 Issue 9, IEEE.

Jakub Špaňhel et al, "Holistic Recognition of Low Quality License Plates by CNN using Track Annotated Data,"IEEE AVSS, Aug. 2017, IEEE.

Rayson Laroca et al, "A Robust Real-Time Automatic License Plate Recognition Based on the YOLO Detector,".

Lele Xie et al, "A New CNN-Based Method for Multi-Directional Car License Plate Detection," IEEE Transactions on Intelligent Transportation Systems, Feb. 2, 2018, vol. 19 No 2, IEEE.

Hui Li et al, "Reading Car License Plates Using Deep Convolutional Neural Networks and LSTMs".

Krueger et al; "Deep nets don't learn via memorization"; Workshop track—ICLR 2017.

Zhang et al;"Understanding Deep Learning Requires Re-Thinking Generalization"—Feb. 26, 2017.

* cited by examiner

Figure 7:
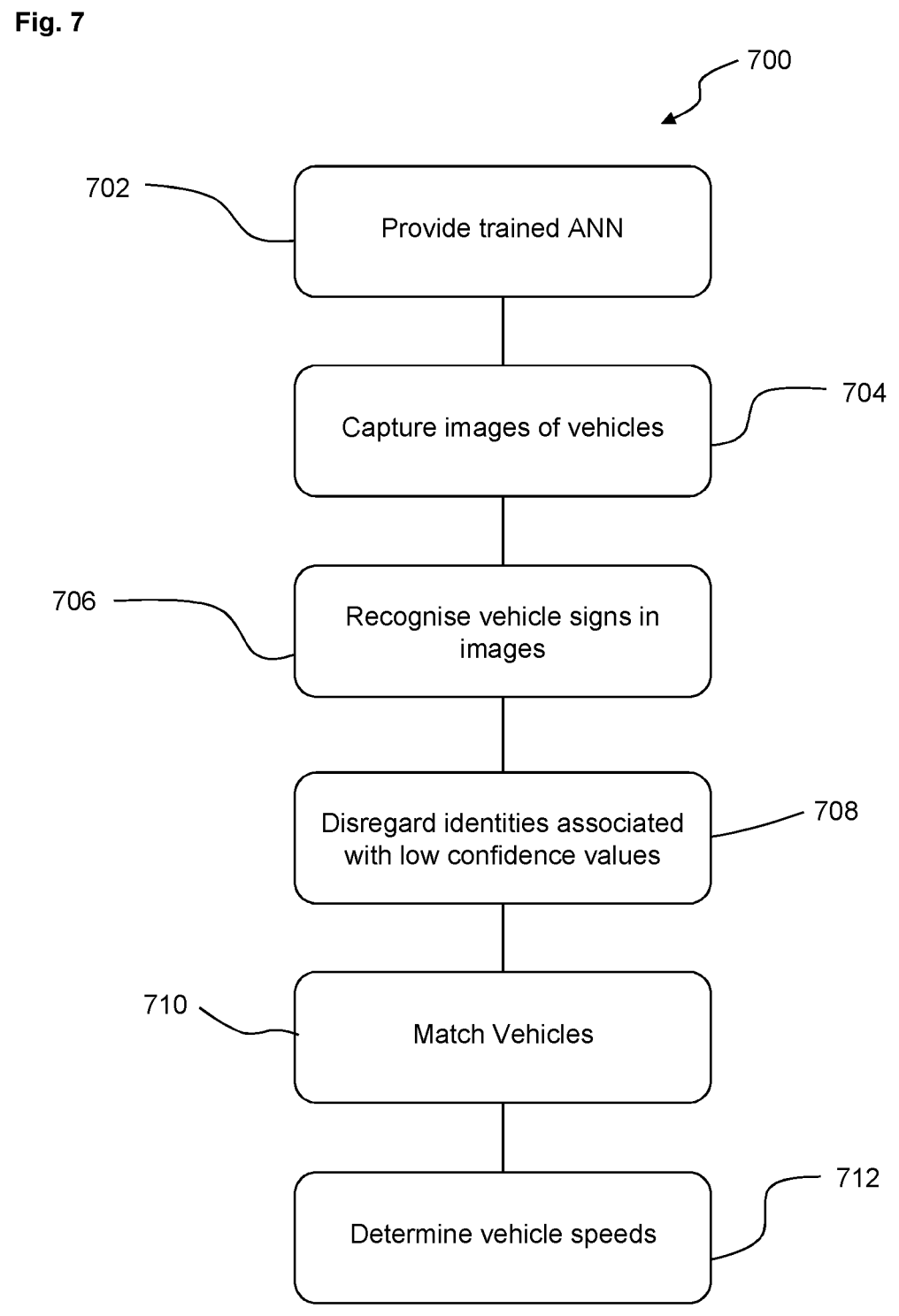

702 — Provide trained ANN

Capture images of vehicles — 704

706 — Recognise vehicle signs in images

Disregard identities associated with low confidence values — 708

710 — Match Vehicles

Determine vehicle speeds — 712

METHODS FOR ARTIFICIAL NEURAL NETWORKS

This nonprovisional application claims priority under 35 U.S.C. § 119(a) to European Patent Application No. EP 19 200 355.6, which was filed on Sep. 30, 2019, and which is herein incorporated by reference

BACKGROUND OF THE INVENTION

Field of the Invention

The present invention relates to methods for artificial neural networks and is particularly, although not exclusively, concerned with a method of using a convolutional neural network for vehicle number plate recognition.

Description of the Background Art

Average speed monitoring systems are often implemented in order to determine the average speeds of vehicles travelling along a section of a road. Such systems can operate by capturing images of the vehicles at first and second locations along the road a known distance apart and determining, based on the times at which the images were taken, how long particular vehicles have taken to travel between the two locations.

The systems are typically capable of automatically recognising the vehicles in the images, so that vehicles in the images taken at the first location can be matched with the vehicles in the images captured at the second location. In this way, times that particular vehicles were at the first and second locations, can be determined automatically.

One option for recognising the vehicles, is to automatically determine the characters, e.g. letters and/or digits, on a number plate of the vehicle. A previously proposed system uses an optical character recognition algorithm to perform the number plate recognition function.

It is undesirable for the system to mistakenly match two different vehicles into a false pair and determine a speed based on the time of one vehicle at the first location and the time of another vehicle at the second location. However, such determinations can be made, for example, when other signs, such as safety or warning signs, comprising characters that could be read as a number plate, are affixed to the vehicles. For example, a heavy goods vehicle having a "long vehicle" warning sign affixed to the vehicle body may be undesirable matched with another vehicle having a similar warning sign.

It is desirable for an algorithm for automatically identifying road vehicles to be provided, which enables such incorrect matchings of vehicle signs to be reduced, without affecting the system's ability to match difficult to read number plates, e.g. which are dirty or otherwise obscured.

SUMMARY OF THE INVENTION

It is therefore an object of the present invention to provide a method for an Artificial Neural Network (ANN).

In an exemplary embodiment, the method includes the features of providing the ANN, e.g. arranging or configuring the ANN in hardware and/or software such that inputs can be fed through the ANN to produce one or more outputs, wherein the ANN is trained to reduce the confidence of the ANN in classifying inputs outside a desirable input distribution by: training the ANN using a first set of inputs and associated labels, the labels correctly classifying the corresponding inputs, wherein the inputs within the first set are within the desirable, e.g. target/intended, input distribution of the ANN; and training the ANN using a second set of inputs and associated labels, wherein the inputs within the second set are outside of the desirable input distribution of the ANN, and wherein the labels within the second set comprise randomly assigned classifications; and feeding one or more inputs through the ANN to determine classifications, classifying the inputs, and confidence values associated with the classifications.

In this way, the confidence values associated with the classification may indicate whether or not the corresponding input is within the desirable input distribution of the ANN. The method may comprise determining whether the input fed through the ANN is within the desirable input distribution based on the confidence value.

Providing the ANN may comprise reading one or more parameters defining the ANN into a memory of a controller or operatively connecting a memory, in which the parameters defining the ANN are stored, to a controller. Additionally or alternatively, providing the ANN may comprise training the ANN According to another aspect of the present disclosure, there is provided a method of training an Artificial Neural Network (ANN), such as a convolutional neural network, to reduce the confidence of the ANN in classifying inputs outside a desirable, e.g. target/intended, input distribution, the method comprising: training the ANN using a first set of inputs and associated labels, the labels correctly classifying the corresponding inputs, wherein the inputs within the first set are within the desirable input distribution of the ANN; training the ANN using a second set of inputs and associated labels, wherein the inputs within the second set are outside of the desirable input distribution of the ANN, and wherein the labels within the second set comprise randomly assigned classifications. In this way, the confidence which the ANN classifies inputs that are similar to the inputs in the second set of inputs may be reduced.

The desirable input distribution may be a distribution or data space containing the inputs that it is desirable for the ANN to classify during use of the trained ANN. The desirable input distribution may be a distribution or data space containing the training examples used to train the ANN. In other words, the desirable input distribution may be a distribution of inputs that the ANN has been trained to recognise. For example, when the ANN is for recognising vehicles, the desirable input distribution may be images of vehicle number plates. Inputs outside of the desirable input distribution may comprise, for example, images of vehicle signs other than number plates.

Training the ANN in this way can reduce the confidence with which the ANN classifies inputs outside the desirable input distribution of the ANN to less than the confidence values given to the classifications of inputs which are within the desirable input distribution but are difficult to classify. Classifications associated with confidence values below a predetermined confidence threshold can therefore be disregarded in order to disregard classifications of inputs outside the desirable input distribution of the ANN, without disregarding classifications of inputs that are within the intended input distribution but are difficult to classify.

Further, training the ANN in this way can minimise the additional training time required to train the ANN to increase the accuracy with which inputs outside the intended input distribution can be disregarded, compared to, for example, adversarial training.

The method may comprise providing, e.g. generating, the first set comprising inputs within the desirable input distribution of the ANN and labels correctly classifying the inputs.

The method may comprise providing, e.g. generating, the second set comprising inputs outside of the desirable input distribution of the ANN and randomly assigned labels.

The ANN may comprise an output layer, which outputs a classification of the input determined by the ANN, e.g. indicating a symbol recognised in a vehicle number plate visible in an image input to the ANN. For example, the output layer may implement a softmax function. The classification may be associated with, e.g. comprise, a confidence value. The confidence value may be a probability, determined by the ANN, that the input has been correctly classified by the ANN.

The inputs within the second set may comprise one or more predetermined inputs that are undesirable to be confidently classified by the ANN. For example, the inputs within the second set may comprise images of one or more vehicle safety signs or hazard warning signs that are known to be displayed on vehicles.

The inputs within the first set may comprise images of vehicle number plates. The labels within the first set may comprise one or more symbols, e.g. letters and/or digits, visible within the corresponding image.

The inputs within the second set comprise images of one or more predetermined signs, other than number plates, known to be affixed to vehicles. Within the present specification, the term "vehicle signs" means any image, picture or message affixed to or displayed on a vehicle that may be determined, by the ANN, to comprise one or more symbols, e.g. characters and/or numbers.

The ANN may be trained using a loss function, such as a cross-entropy loss function, free from an adversarial term. The ANN may be trained using the same loss function and training algorithm, e.g. back propagation algorithm, when training with both the first set and the second set of inputs.

Inputs from the second set may be interspersed with inputs from the first set during training of the ANN, e.g. in the inputs that are fed through or propagated forwards through the ANN during the training process.

The second set of inputs may comprise one or more augmented inputs comprising artificially manipulated versions of another input within the second set, e.g. manipulated using an image processing software or algorithm. Different random labels may be associated with each augmented input and the input from which the augmented input is derived. A different random label may be associated with each of the inputs in the second set, e.g. regardless of whether the particular input shows the same symbols as another of the inputs.

The number of inputs within the second set may be less than or equal to 5%, be less than or equal to 4%, less than or equal to 3%, less than or equal to 2% or less than or equal to 1% of the total number of inputs used to train the ANN.

According to another aspect of the present disclosure, there is provided a method of training an Artificial Neural Network (ANN), such as a convolutional neural network, for recognising road vehicle number plates and reducing the confidence of the ANN in classifying inputs other than vehicle number plates, e.g. vehicle signs, such as vehicle safety signs or hazard warning plates, the method comprising: training the ANN using a first set of inputs and associated labels, the inputs comprising images of vehicle number plates and the labels comprising one or more symbols, e.g. characters or digits, in the number plate visible in the corresponding input image; and training the ANN using a second set of inputs and associated labels, wherein the inputs within the second set comprise images of one or more predetermined signs, other than vehicle number plates, and wherein the labels within the second set comprise one or more randomly assigned letters and/or digits.

A method for an artificial neural network, e.g. a method of recognising a vehicle number plate, may comprise: providing the ANN, wherein the ANN has been trained using the above-mentioned method; and feeding inputs, e.g. images of vehicles, through the ANN in order to determine classifications classifying the inputs, e.g. identities (number plates) of the vehicles, and confidence values associated with the classifications. The method may further comprise determining whether the classification corresponds to a number of a vehicle plate (or another vehicle sign) based on the confidence value. The method may further comprise determining a location and/or speed of the vehicle based on the determined identity of the vehicle.

The confidence values may represent the probabilities, determined by the artificial neural network, that the respective inputs (images of vehicles) are correctly classified, e.g. recognised, by the determined classifications, and may indicate whether the input is within the intended input distribution, e.g. is an image of a vehicle number plate.

According to another aspect of the present disclosure, there is provided a method for an Artificial Neural Network (ANN), the method comprising: providing the ANN, wherein the ANN has been trained for recognising road vehicle number plates and to reduce the confidence of the ANN in classifying inputs other than road vehicle number plates by: training the ANN using a first set of inputs and associated labels, the inputs comprising images of vehicle number plates and the labels comprising one or more letters or digits in the number plate visible in the corresponding input image; and training the ANN using a second set of inputs and associated labels, wherein the inputs within the second set comprising images of one or more predetermined signs, other than vehicle number plates, and wherein the labels within the second set comprise one or more randomly assigned classifications, e.g. comprising one or more letters and/or digits; and feeding an input image through the ANN to determine a classification of the image, such as an identity, e.g. symbols in a number plate, of a vehicle visible in the image, and a confidence value corresponding to the probability that the classification corresponds to a vehicle number plate visible in the image, e.g. rather than a sign other than a vehicle number plate.

The method may further comprise capturing an image of a vehicle to be used as the input image to be fed through the ANN. The method may further comprise determining whether the classification corresponds to a number of a vehicle plate (or another vehicle sign) based on the confidence value. The method may further comprise determining a location and/or speed of the vehicle based on the determined identity of the vehicle.

A method of determining average speeds of vehicles travelling along a road may comprise: capturing images of vehicles at first and second locations along a road; recognising vehicles within the images using the above-mentioned method, the captured images being used as inputs, to determine identities, e.g. number plates, of vehicles visible in the images; matching vehicle identities determined from the images captured at the first and second locations; disregarding one or more recognised vehicle identities or matched vehicle identities associated, by the artificial neural network, with confidence values that are less than a predetermined confidence threshold; and determining average speeds of vehicles having the matched vehicle identities based on the times at which the images of the vehicles were captured at the first and second locations and the distance between the first and second locations.

There can be provided a memory, e.g. a computer-readable storage medium, such as a non-transitory computer-readable storage medium, comprising computer-readable instructions, which, when executed by a processor, cause the processor to perform the above-mentioned method There may also be provided a memory, e.g. a computer-readable storage medium, such as a non-transitory computer-readable storage medium, storing one or more parameters, such as weights, e.g. kernels, and biases corresponding to nodes and/or connections, defining an Artificial Neural Network (ANN) trained according to the above-mentioned method. The memory may store computer-readable instructions, which, when executed by a processor, cause the processor to process an input using the ANN to determine a classification classifying the input and a confidence valve associated with the classification.

A system may comprise a processor and the above-mentioned memory operatively connected to the processor.

The system may further comprise a first camera, for capturing images of vehicles travelling along a road at a first location, and may further comprise a second camera, for capturing images of vehicles travelling along the road at a second location. The first and second location may be a known distance apart.

The computer-readable instructions stored by the memory may cause images captured by the first and second cameras to be processed by the ANN. The classifications determined by the ANN may correspond to an identity, e.g. symbols comprised in a number plate or a vehicle sign visible in the image. The confidence value may correspond to a probability that the image shows a number plate and that the number plate has been correctly recognised by the ANN.

The ANN may be an ANN trained using to the above-mentioned method. The method may comprise providing an ANN, e.g. a convolutional neural network, trained according to the above-mentioned method, e.g. by training an ANN according to the above-mentioned method.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

In any of the above aspects, the various features may be implemented in hardware, or as software modules running on one or more processors.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention. For example, the features described in relation to the first and second mentioned aspects may be combined with the features of any of the other aspects.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 7 is a flow chart illustrating a method of determining average speed of road vehicle, according to arrangements of the present disclosure.

DETAILED DESCRIPTION

Figure 1:
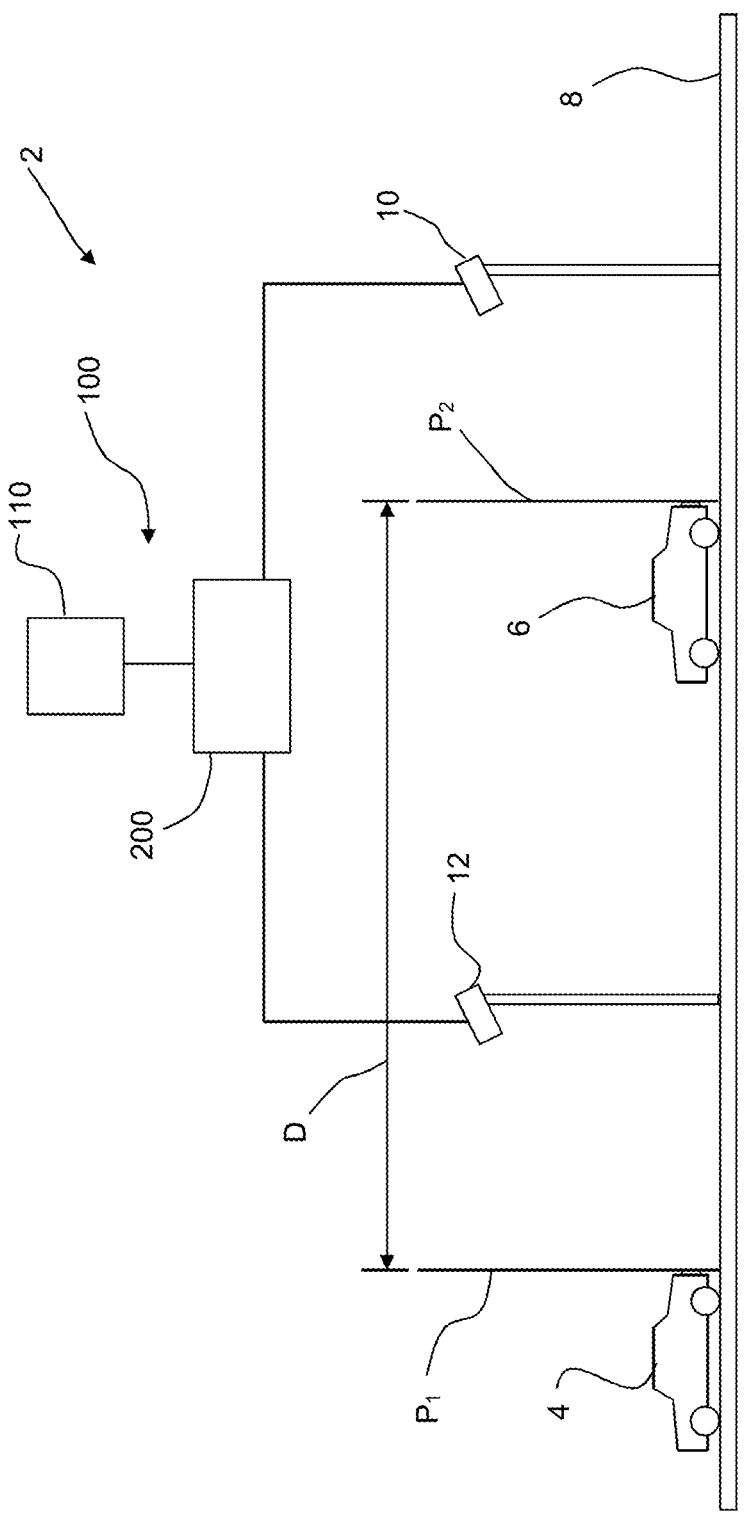
FIG. 1 is a schematic view of a system for determining average speeds of road vehicles, according to arrangements of the present disclosure.

With reference to FIG. 1, a system 2, in which the average speeds of vehicles 4, 6 travelling along a road 8 can be determined, will now be described. The system 2 comprises a first camera 10, arranged to capture images of the vehicles at a first position $P_1$ along the road, a second camera 12, arranged to capture images of the vehicles at a second position $P_2$ along the road. The first and second cameras 10, 12 are arranged such that the first and second positions $P_1$, $P_2$ are a known distance D apart from each other along the road.

The system 2 comprises a vehicle recognition and speed determination system 100. The vehicle recognition and speed determination system 100 comprises a vehicle recognition controller 200 comprising one or more modules configured to identify vehicles within images captured by the first and second cameras 10, 12.

The terms "recognise a vehicle" and "identify a vehicle" may be used in this specification to mean to determine one, more than one or each of the symbols, e.g. characters (letters) and/or digits (numbers), within a number plate (licence plate) of the vehicle, displayed in one or more rows. The term "identity of a vehicle" is used to mean the symbols of the vehicle number plate that have been identified or recognised.

The vehicle recognition controller 200 may be provided at the roadside. For example, the vehicle recognition controller 200 may be provided in the same housing together with one of the first and second cameras 10, 12 and/or may be mounted on the same utility pole, structure or gantry as the first or second camera. Alternatively, the vehicle recognition controller 200 may be located remotely from the roadside, e.g. in a remote data centre, and may be configured to receive information from the first and second cameras via a wired or wireless connection, e.g. a network connection.

The system 100 may further comprise a speed determination controller 110 comprising one or more modules configured to match the vehicles identified in the images captured by the first camera 10 with the same vehicle identified in the images captured by the second camera 12, e.g. based on the identities of the vehicles determined by the vehicle recognition controller 200.

The speed determination controller 110, e.g. one or more modules of the speed determination controller, may be further configured to determine an average speed of the matched vehicles based on the times at which the images of the matched vehicles were captured at the first and second locations $P_1$, $P_2$ and the distance D between the first and second locations.

In other arrangements, the vehicle recognition controller 200, e.g. one or more modules of the vehicle recognition controller 200, may be configured to match the vehicles identified in the images captures by the first and second cameras, and may be configured to determine the average speed of the matched vehicles. In such arrangements, the speed determination controller 110 may be omitted.

Figure 2:
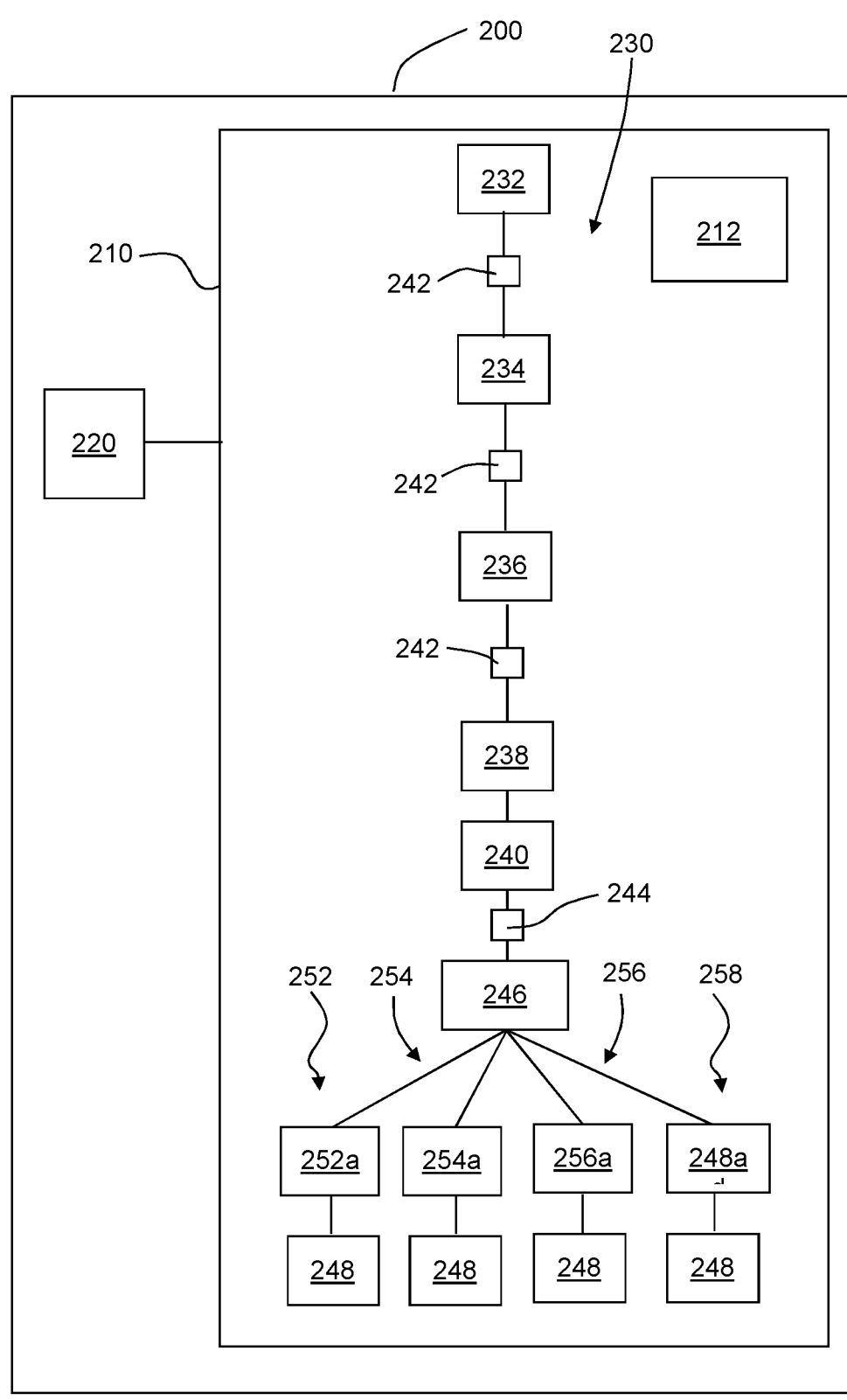
FIG. 2 is a schematic view of a system for recognising vehicle number plates, according to the present disclosure.

With reference to FIG. 2, the vehicle recognition controller 200 may comprise a memory 210, e.g. a computer-readable storage medium, such as a non-transitory computer-readable storage medium, and a processor 220 operatively connected to the memory 210. The memory 210 may be storing one or more parameters defining an Artificial Neural Network (ANN) 230 configured for recognising vehicles within the images captured of the vehicle.

In one or more arrangements, the memory 210 may be storing a plurality of weights, e.g. defining one or more kernels, and/or biases corresponding to nodes and/or connections between nodes forming the ANN. The weights and/or biases may be stored within one or more data structures defining an architecture of the ANN.

The memory 210 may further store computer-readable instructions 212, which, when executed by a processor, such as the processor 220, cause the processor to feed or propagate an input forwards through the ANN 230 and determine an output, e.g. a classification, from the ANN corresponding to the input. In the arrangement shown, the input may comprise an image captured by the first or second camera 10, 12 and the output may comprise the identity of the vehicle. In particular the inputs may comprise matrices comprising values representing the pixels of the images captured by the first and second cameras 10, 12, and the outputs may comprise symbols in number plates of vehicles visible in the images.

In one or more arrangements, the ANN 230 is a Convolutional Neural Network (CNN). As depicted in FIG. 2, the CNN may comprise between 3 and 7 convolutional layers, such as 5 convolutional layers. In one arrangement, the CNN comprises a first convolutional layer 232 comprising 32 5×5 kernels, a second convolutional layer 234 comprising 64 3×3 kernels, a third convolutional layer 236 comprising 128 3×3 kernels, a fourth convolutional layer 238 comprising 512 1×1 kernels and a fifth convolutional layer 240 comprising 64 1–1 kernels. In other arrangements, the fifth convolutional layer 240 layer may have 64 3×3 kernels.

The convolutional layers may operate with a stride of 1. Alternatively, the convolutional layers may operate with a stride greater than 1, such as 2, and may implement valid or same packing, e.g. to preserve the image size. The convolutional layers may use a rectified linear activation function with a small negative slope (leaky ReLU activations).

The CNN may comprise pooling layers, such as max pooling layers, between one, more than one or each of the convolutional layers. For example, the CNN may comprise 2×2 max pooling layers 242 after the first, second and third convolutional layers, and may comprise a 1×2 (vertical only) may pooling layer 244 after the fifth convolutional layer 240.

The CNN may further comprise one or more fully connected layers 246 following the convolutional layer. For example, the CNN may comprise 1, 2, 3 or more than 3 fully connected layers comprising, for example, 2048, 4096, or 1000 nodes, following the convolutional layers.

In another arrangement, the convolutional neural network may comprise a first convolutional layer comprising 96 11×11 kernels, a second convolutional layer comprising 256 2×2 kernels, a third convolutional layer comprising 384 3×3 kernels, a fourth convolutional layer comprising 384 3×3 kernels, a fifth convolutional layer comprising 256 3×3 kernels, a first fully connected layer comprising 4096 nodes, a second fully connected layer comprising 4096 nodes and a third fully connected layer comprising 1000 nodes.

As depicted in FIG. 2, in one or more arrangements, the CNN may comprise two or more separate symbol identification and/or country identifying branches 252, 254, 256, 258, each of the symbol identification branches may be configured for identifying one of several symbols of the number plate. For example, each of the symbol identification braches may be configured to identify a symbol at a particular character position in the vehicle number plate. The country identifying branch may be for identifying the country having issued the number plate.

In the context of the present specification, separation of the branches of the ANN can be understood to mean that no information is transferred from the nodes or layers within one separated branch to the nodes or layers within another of the separated branches.

In the arrangement shown, the CNN comprises four separate branches comprising threes symbol identification branches 252, 254, 256 and one country identifying branch 258. As depicted, each of the symbol identification branches may be comprise at least one fully connected layer 252a, 254a, 256a, 258a that is connected to the shared fully connected layers 246 following the convolutional layers of the CNN. The fully connected layer within each of the symbol identification branches may be configured to determine the respective symbol present at the characters position in the vehicle number plate that the symbol identification branch is concerned with. The fully connected layer within the country identifying branch may be configured to determine the country having issued the number plate.

The ANN 230 may comprise one or more output layers 248 configured to output the identity of the vehicle number plate determined using the ANN. The output from the ANN may comprise a series of probabilities of a particular symbol, e.g. letter, digit or space, appearing at a particular character position in the number plate. For example, the output may comprise 37 probabilities for each character position in the number plate corresponding to the probabilities of the 26 letters in the Latin alphabet, the 10 digits or a space appearing at the particular character position on the number plate. The classification may be considered to be the output associated with the highest probability, e.g. for a particular character position in the number plate.

The output layer may comprise 37 nodes for each character position in the number plate for outputting the corresponding probabilities. The output layer may implement one or more independent softmax functions (e.g. relating to respective character positions) in order to determine the respective probabilities.

When the ANN 230 comprises the plurality of symbol identification branches and/or the country identification branch, the output layers may be provided in the branches. For example, each of the symbol identification branches may comprise a separate output layer configured to output the probabilities of the symbol at the particular position in the number plate that the particular symbol identification branch is concerned with, being each one of the 37 possibilities of characters, digits or a space. The country identifying branch may comprise an output layer configured to output the probabilities of the country being issued by each of the countries the ANN is configured to distinguish between.

For example, in one arrangement, the ANN, e.g. the country identification branch of the ANN, is configured to determine whether the country having issued the number plate is the United Kingdom, Germany, France or the Netherlands. In such an arrangement, the output layer provided in the country identification branch comprises 4 nodes configured to output the probability of the number plate having been issued by each of the four countries of interest.

The probabilities output by the output layer or layers of the ANN may be referred to as confidence values, and may represent the confidence with which the symbol or country has been identified by the ANN. The confidence values may be affected by factors such as lighting of the number plate in the image and obstructions of the number plate, e.g. by dirt present on the number plate.

It is desirable for the ANN 230 to be configured, e.g. structured and/or trained, such that the confidence values of the identified characters are high, e.g. above a predetermined threshold, for substantially all lighting conditions and reasonable levels of obstructions of the number plate, so that a desirable proportion of the vehicles can be confidently identified. The confidence value of a vehicle identity may be defined as the product of more than one or each of the confidence values associated with the individual symbols within the vehicle identity.

When the vehicles identified in the first and second images are being matched, vehicle identities with low confidence value, e.g. less than a predetermined confidence threshold, may be disregarded, in order to avoid incorrectly matching vehicles. Alternatively, any matches made between vehicles relying on low confidence values, may be disregarded, e.g. not used to determine average speeds of the vehicles.

In addition to number plates, vehicles may comprise one or more other signs, such as warning or safety signs, which are similar in appearance to number plates. As noted above, it may be undesirable for vehicles within the first and second images to be matched using identifications of the vehicles determined from images of such other signs.

Accordingly, it may be desirable for the ANN to associate outputs resulting from feeding images of non-number plate signs through the neural network with low confidence values. In particular, it may be desirable for the outputs determined for non-number plate signs to be associated with confidence values that are less than the confidence values achieved by the ANN when the input comprises an image of a dirty number plate or a number plate that is poorly lit.

However, it is a property of ANNs that the network can ascribe a high confidence value to the classification of an input outside of an intended, or target, input distribution of the network, e.g. the distribution of inputs on which the ANN has been trained and is intended to operate on. This arises due to the input being far from any decision hyperplanes in the data space that have been established through training the ANN. This property is illustrated in FIG. 3.

Figure 3:
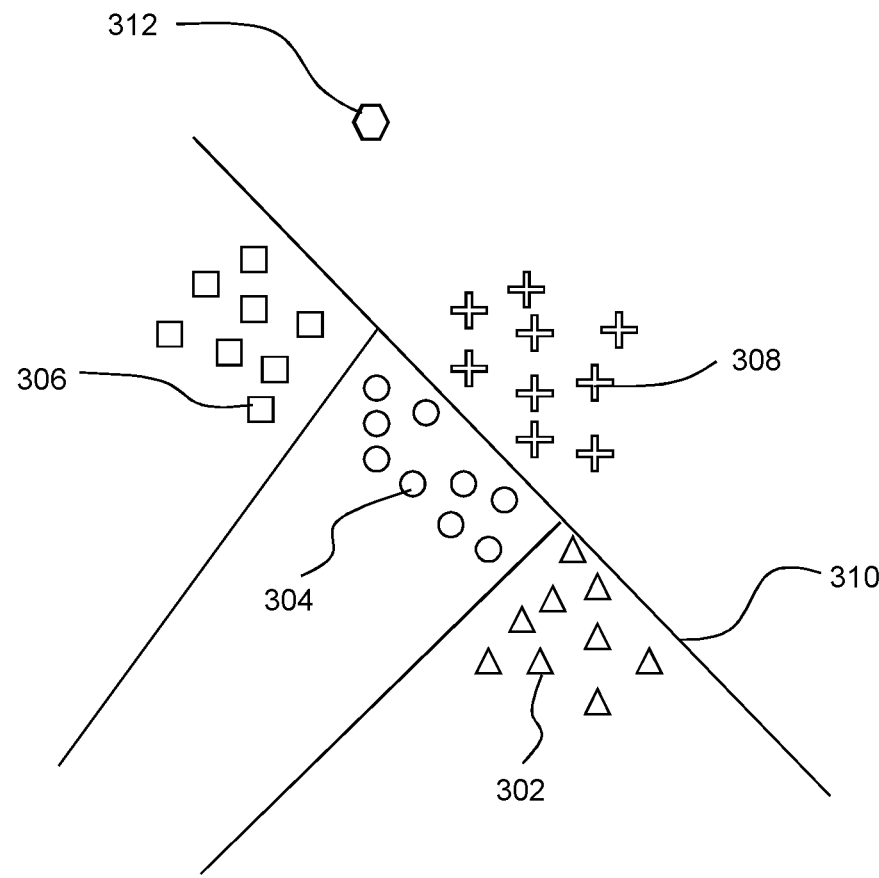
FIG. 3 is a diagram illustrating the tendency of artificial neural networks to confidently classify inputs outside of an intended input distribution.

As shown in FIG. 3, first inputs 302, depicted as triangles, correspond to images having a first classification, second inputs 304, depicted as circles, correspond to images having a second classification, third inputs 306 inputs, depicted as squares, correspond to images having a third classification and fourth inputs 308, depicted as crosses, correspond to images having a fourth classification. Through training the ANN, decision hyperplanes 310 have been established in the dataspace between the first, second, third and fourth inputs enabling the ANN to correctly classify the first, second, third and fourth inputs.

As depicted in FIG. 3, a further input 312 outside the intended input distribution of the ANN, such as an image of a non-number plate sign, would be classified by the ANN as being within the fourth classification, due to its location in the dataspace relative to the decision hyperplanes 310. Furthermore, because the further input is far from the decision hyperplanes separating the inputs within the fourth classification from inputs in the other classifications, the ANN will ascribe a high confidence value to the classification of the further input 312.

Figure 4:
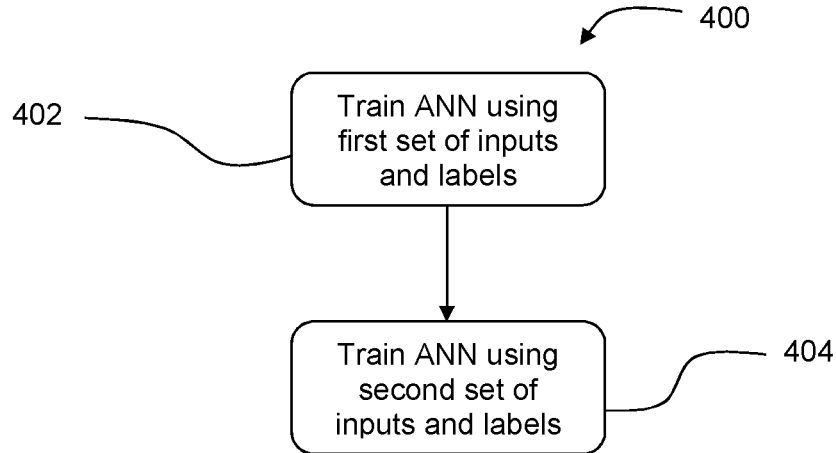
FIG. 4 is a flow chart illustrating a method of training an artificial neural network according to arrangements of the present disclosure.

With reference to FIG. 4, in order to reduce the confidence values ascribed to outputs from the ANN when processing images outside the intended input distribution of the ANN, e.g. when processing images of signs other than number plates, the ANN may be trained using a method 400, according to the present disclosure.

The method comprises a first block 402, at which the ANN is trained using a first set of inputs and associated labels, the associated labels correctly classifying the corresponding input. The first set of inputs comprises inputs within an intended input distribution of the ANN. For example, the inputs within the first set of inputs may comprise images of number plates of vehicles.

The ANN 230 may be trained using any desirable method. In one arrangement, the ANN is trained by determining a cross-entropy loss, based on a comparison between the output determined by the ANN and the label associated with the input in the training set, and updating the weights and biases of the ANN using a back propagation algorithm implementing gradient decent. The ANN may be updated using batch or stochastic updates. In other arrangements, the ANN may be trained using the first set of inputs following any other desirable training procedure.

When the ANN comprises the separate symbol identification branches and/or country identification branch, a separate loss may be determined for the output of each branch and the respective updates may be back propagated through each branch and combined in order to update the nodes within the shared layers of the ANN.

The method 400 comprises a second block 404, at which the ANN 230 is trained using a second set of inputs and associated labels. The inputs within the second set of inputs may be outside of the intended input distribution of the ANN. For example, the inputs within the second set of inputs may comprise images of signs other than number plates, such as warning or safety signs, that may be affixed to road vehicles. More particularly, the inputs within the second set may comprise images of one or more predetermined signs, other than number plates, that are known to be affixed to road vehicles and which it is undesirable to confidently recognise using the ANN.

The labels within the second set may comprise randomly generated/assigned labels. A different random label may be associated with each of the inputs within the second set. In some arrangements, the inputs within the second set may comprise a plurality of images of the same sign, for example, the second set may comprise one or more augmented inputs comprising artificially manipulated versions of another input in the second set. A different label may be associated with the each of the inputs, e.g. regardless of whether the input image shows the same or a different sign.

The ANN 230 may be trained using the second set of inputs and associated labels using the same training method used when training the ANN using the first set of inputs and associated labels. In particular, the loss function and back propagation algorithm may be the same when training using the first and second sets. The loss function may be free from any adversarial term.

Figures 5, 6:
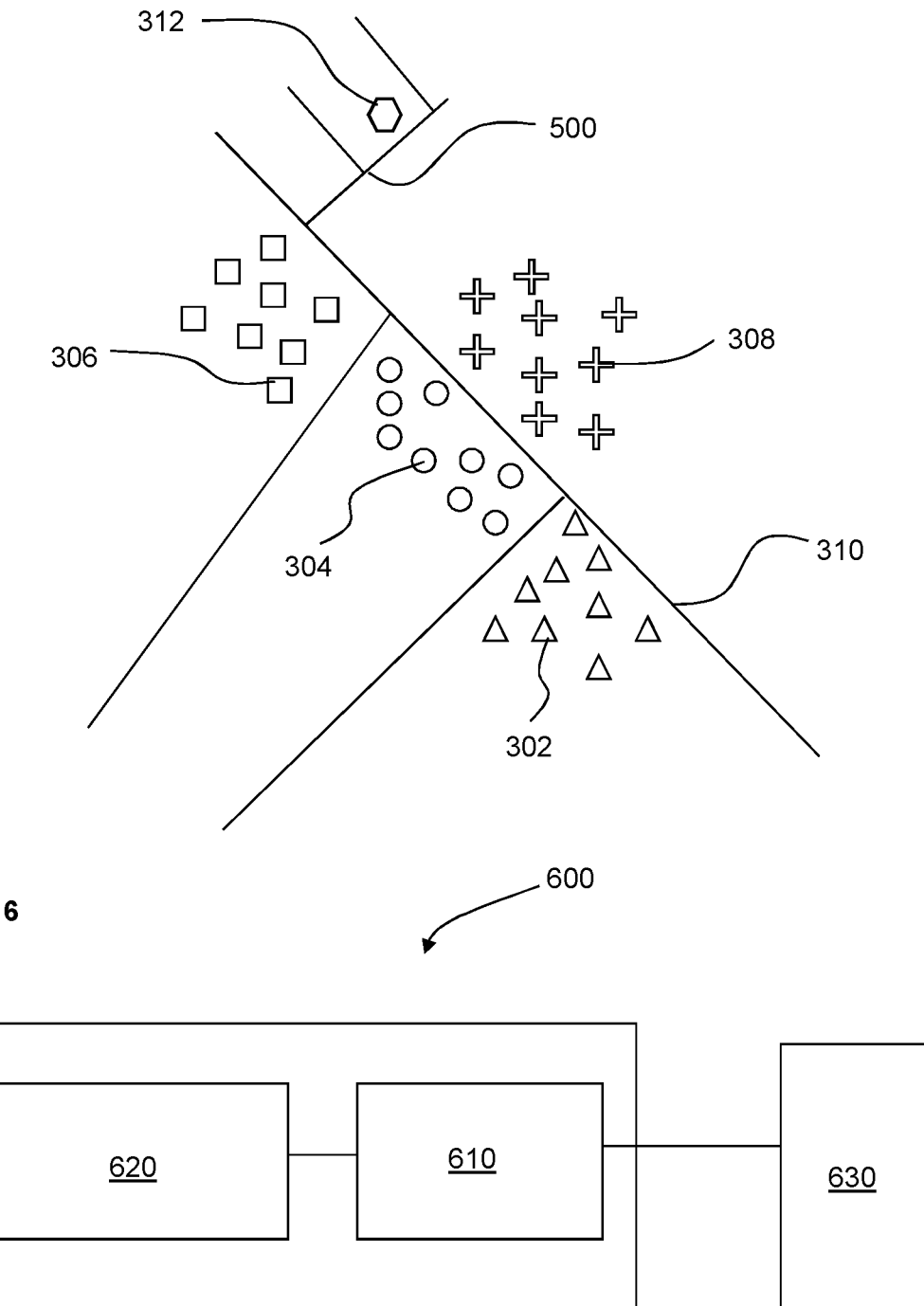
FIG. 5 is a diagram illustrating how the classification of input by an artificial neural network is affected by training the artificial according to the method shown in FIG. 4.
FIG. 6 is a schematic view of a system for training an artificial neural network according to arrangements of the present disclosure.

With reference to FIG. 5, training the ANN using the second set of inputs and associated labels, in addition to the first set, may lead to the definition of a plurality of further decision hyperplanes 500 in the dataspace of inputs that are close to the inputs in the second set, e.g. closer to the inputs within the second set than the decision hyperplanes 310 between the inputs in the first set.

Following training of the ANN using the method 400, feeding the input 312 through the ANN may no longer provide the same output as when an input corresponding to the fourth classification is input to the ANN. Further, the confidence value associated with the output resulting from the input 312 being fed through the ANN will be reduced, due to the presence of the further decision hyperplanes 500 defined by the ANN in the dataspace close to the input 312.

Returning to FIG. 4, the second block 404 may follow the first block 402. In other words, the ANN may be trained using the first set and may subsequently be trained using the second set. Alternatively, the first and second blocks 402, 404 may be substantially simultaneous. The inputs within the second set may be interspersed with the inputs within the first set when providing inputs to the ANN during training.

The number of inputs within the second set of inputs may be selected such that confidence values ascribed to outputs, which result from inputting images of the predetermined signs other than number plates into the ANN, are below a threshold confidence. In some arrangements, the number of inputs within the second set of inputs may be selected such that confidence values ascribed to outputs determined for inputs comprising images of the predetermined signs, other than number plates, are less than the confidence values ascribed to outputs determined for inputs comprising images of vehicle number plates that are poorly lit, dirty or otherwise partially obscured, but still able to be correctly recognised by the ANN.

For example, the number of inputs and associated labels in the second set may be approximately equal to or less than 5% of the total number of inputs used to train the ANN. In other arrangements, the number of inputs and associated labels in the second set may be approximately equal to or less than 4%, 3%, 2% or 1% of the total number of inputs used to train the ANN 230. The number of inputs and associated labels in the second set may be approximately equal to greater than 1%, 2%, 3% or 4% of the total number of inputs used to train the ANN 230.

With reference to FIG. 6, a system 600 for training an ANN, such as the ANN 230, according to the method 400, comprises a processor 610 and a memory 620, the memory 620 storing computer readable instructions, which, when executed by the processor cause the processor to perform the method 400 to train the ANN.

In some arrangements, the ANN 230, e.g. the parameters defining the ANN may be stored on the memory 620. Alternatively, the processor 610 may be connected to a further memory 630 storing the parameters defining the ANN and may update the parameters stored in the further memory whilst performing the method 400.

Similarly, the first and/or second sets of inputs and associated labels may be stored on the memory 620. Alternatively, the first and/or second sets of inputs and associated labels may be stored on the further memory or another memory associated with the processor.

With reference to FIG. 7, the vehicle recognition and speed determination system 100 shown in FIG. 1, may be configured to recognise vehicles and may be configured to determine locations and/or speeds, e.g. average speeds, of vehicles travelling along the road 8, within the system 2, according to a method 700.

The method 700 may comprise an initial block 702 at which an ANN trained according to the method 400 is provided. For example, the method 700 may comprise, at the initial block 702, reading parameters defining the ANN into a memory, e.g. associated with a controller to perform one or more of the remaining steps of the method 700. Alternatively, a memory having the parameters defining the ANN stored thereon may be associated with, e.g. operatively connected to, the controller to perform one or more of the remaining steps of the method 700. In some arrangements, providing the ANN may comprise, at the initial block 702, training an ANN using the method 400.

The method 700 may comprise a first block 704 at which one or more images of vehicles are captured. For example, images may be captured of the vehicles at first and second locations P1, P2 along a road 8, e.g. by the first and second cameras 10, 12.

The method 700 comprises a second block 706, at which vehicle number plates within the images are recognised, e.g. using the ANN 230. At the second block 706, vehicle signs other than number plates may also be recognised by the ANN. However, due to the method by which the ANN 230 has been trained, confidence values associated with the outputs given by the ANN may be reduced when the input comprises an image showing a sign other than a number plate. In particular, the confidence value may be reduced when the input comprises an image of one of the predetermined signs that were shown in images within the second set of inputs, used to train the ANN.

The method 700 may comprise a third block 708, at which one or more recognised vehicle identities associated, by the ANN, with confidence values that are less than a predetermined confidence threshold are disregarded.

The identity of the vehicle, e.g. determined by recognising the number plate of the vehicle using the ANN, may be used to determining a location and/or speed of the vehicle, e.g. based on the location in which the image used as the input to the ANN was captured and/or the time at which it was captured.

The method may further comprise a fourth block 710, at which vehicles within the images captured at the first and second locations are matched based on the recognised vehicle identities that have not been disregarded.

In the arrangement described, the one or more vehicle identities associated with low confidence values are disregarded prior to the vehicle being matched based on the identities that have not been disregarded. However in other arrangement, the vehicles may be matched based on the determined identities and subsequently matches may be disregarded if the match was performed based on an identity associated with a low confidence value.

The method 700 may further comprise a fifth block, at which average speeds of vehicles having the matched identities are determined based on the times at which the images of the vehicles were captured at the first and second locations and the distance between the first and second locations.

Although the present disclosure has described arrangements in which an ANN, particularly a CNN, is used to recognise vehicle number plates within input images and disregard inputs comprising images of other vehicle signs, in other arrangements, the ANN may have any other desired structure and the methods described herein may be used to train the ANN to classify any other inputs within another desirable input distribution and to reduce the confidence with which the ANN classifies inputs outside the desirable input distribution.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for recognizing vehicles using an artificial neural network, the method comprising: providing the artificial neural network, wherein the artificial neural network is trained to reduce the confidence of the artificial neural network in classifying inputs outside a desirable input distribution by: training the artificial neural network using a first set of inputs and associated labels, the labels correctly classifying the corresponding inputs, wherein the inputs within the first set are within the desirable input distribution of the artificial neural network, and wherein the inputs within the first set comprises images of road vehicle number plates; and training the artificial neural network using a second set of inputs and associated labels, wherein the inputs within the second set comprise plurality of predetermined inputs that are undesirable to be confidently classified by the artificial neural network and are therefore outside of the desirable input distribution of the artificial neural network, wherein the inputs within the second set comprise images of one or more predetermined signs, other than number plates, known to be affixed to road vehicles, and wherein the labels within the second set comprise randomly assigned classifications of second set of inputs and associated labels to reduce confidence values associated with the classifications wherein a number of inputs within the second set of inputs may be selected such that confidence values ascribed to outputs are below a threshold value; and feeding one or more inputs through the artificial neural network to determine classifications, classifying the inputs, and the confidence values associated with the classifications.

2. The method of claim 1, wherein the inputs comprise images and the labels comprise one or more letters and/or digits visible within the corresponding image.

3. The method of claim 1, wherein the artificial neural network is trained using the same loss function and training algorithm when training with both the first set and the second set of inputs.

4. The method of claim 1, wherein inputs from the second set are interspersed with inputs from the first set during training of the artificial neural network.

5. The method of claim 1, wherein the second set of inputs comprises one or more augmented inputs comprising artificially manipulated versions of another input, wherein a different random label is associated with the input and the augmented inputs.

6. The method of any of claim 1, wherein the artificial neural network is trained using a loss function free from an adversarial term.

7. The method of claim 1, wherein providing the artificial neural network comprises training the artificial neural network.

8. A method of determining average speeds of vehicles travelling along a road, the method comprising:

capturing images of vehicles at first and second locations along a road;

recognising vehicles within the images using the method of claim 1 with the captured images being used as inputs, to determine identities of vehicles visible in the images;

matching vehicle identities determined from the images captured at the first and second locations;

disregarding one or more recognised vehicle identities or matched vehicle identities associated, by the artificial neural network, with confidence values that are less than a predetermined confidence threshold; and determining average speeds of vehicles having the matched vehicle identities based on the times at which the images of the vehicles were captured at the first and second locations and the distance between the first and second locations.

9. A processor comprising computer-readable instructions, which, when executed by a processor, cause the processor to perform the method of claim 1.

* * * * *